(No Model.)
W. E. MEYER, C. M. YOUNG & A. V. BOYCE.
WHEEL.
No. 524,424. Patented Aug. 14, 1894.
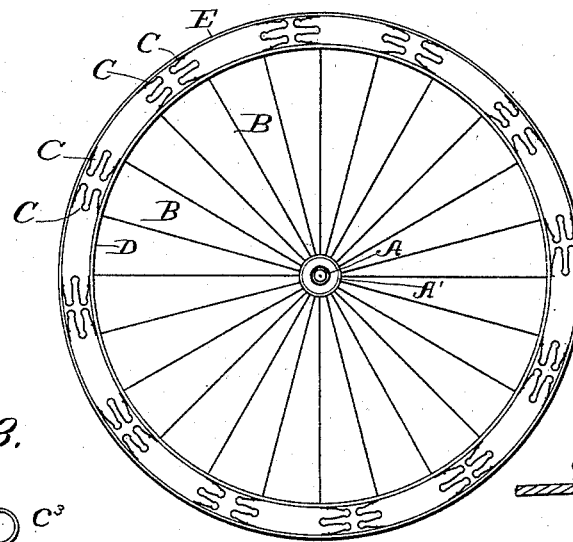
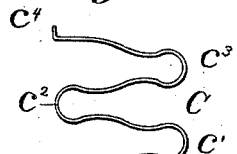
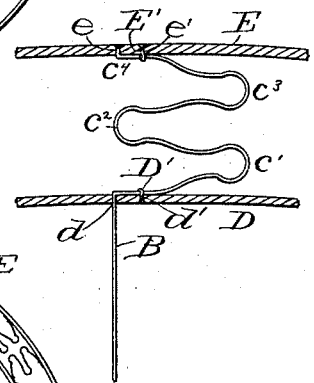
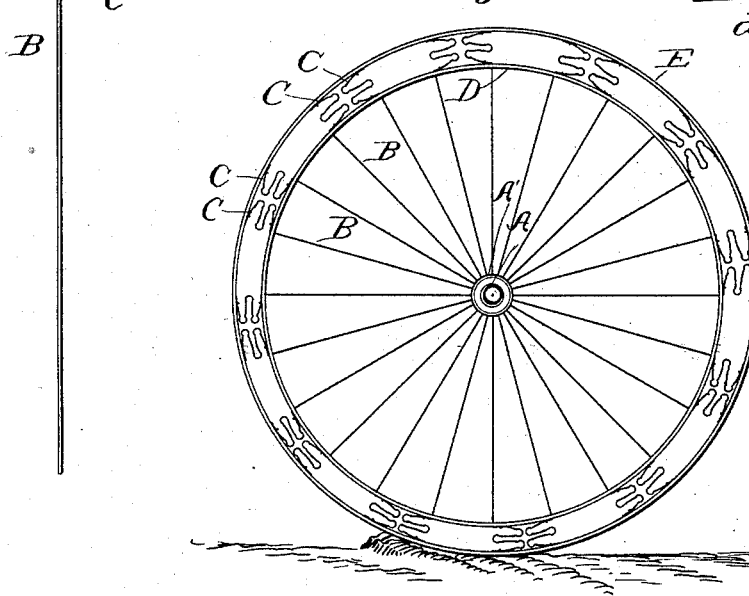
Attest
CleBurdine
G. Arthur Pennington
Inventors
William E. Meyer,
Charles M. Young,
Amos V. Boyce,
by A. H. Adolington
Att'y

UNITED STATES PATENT OFFICE.

WILLIAM E. MEYER, CHARLES M. YOUNG, AND AMOS V. BOYCE, OF COLUMBUS, OHIO.

WHEEL.

SPECIFICATION forming part of Letters Patent No. 524,424, dated August 14, 1894.

Application filed March 24, 1894. Serial No. 504,996. (No model.)

*To all whom it may concern:*

Be it known that we, WILLIAM E. MEYER, CHARLES M. YOUNG, and AMOS V. BOYCE, residing at Columbus, in the county of Franklin and State of Ohio, have invented certain new and useful Improvements in Wheels; and we do hereby declare the following to be a full, clear, and exact description of the invention, such as will enable others skilled in the art to which it appertains to make and use the same.

This invention relates to an improvement in wheels and it consists in the construction and arrangement of parts hereinafter described and claimed.

The object of the invention is the provision of a wheel for bicycles or other vehicles which will embody improved elastic features whereby a yielding or cushion effect is acquired in a durable and effective manner. This object is attained by the construction illustrated in the accompanying drawings wherein like letters of reference indicate corresponding parts in the several views and in which—

Figure 1 is an elevation of the improved wheel. Fig. 2 is a similar view showing the relative position of the rims while the wheel is passing over an obstruction. Fig. 3 is a detail view of a spoke and spring, and Fig. 4 is a section of the rim showing a spring in its adjusted position.

In the drawings A represents a hub having the spoke disks A' in which the ends of the spokes are secured.

B represents the spokes formed at their outer ends into substantially W-shaped springs C. These springs constitute integral extensions of the spokes and consist of the right angle portions $c$ which extend up at an incline a short distance from the spokes, and are formed into rounded heads $c'$ at their outer ends and then carried back at an incline and formed into a like head $c^2$, thence in the opposite direction at an incline where they are formed into like heads $c^3$ and thence back to a point above the spoke where they are bent outward at substantially right angles forming the terminations $c^4$.

D is the inner felly or rim formed of rigid or non-yielding material, and having the perforations $d$ $d'$ therein arranged in pairs. Through the perforations $d$ the ends of the spokes pass.

D' represent eye bolts which are secured in the perforations $d'$ and through the eyes of which the portion $c$ of the springs pass and are rigidly held, thereby fixedly securing the outer ends of the spokes to the inner felly.

E is the outer felly or rim formed of rigid non-yielding material having the apertures $e$ $e'$ therein arranged in pairs. The outer ends of the springs $c^4$ pass at right angles through the apertures $e$ and are riveted or otherwise there secured. E' are eye bolts secured in the apertures $e'$ and through which the portion $c^4$ of the springs pass and are secured.

The springs C are arranged alternately in opposite directions, so that one will counteract the other when under tension and by forming the same with the heads or curves all sharp breakable angles are avoided and an increased springing effect acquired. In forming the spokes and springs integral a very strong structure is had and one which can be easily and cheaply manufactured, the wheel constructed with the least number of separate parts, and quickly and firmly built up.

By the utilization of rigid inner and outer rims, the entire series of springs are brought into action simultaneously and proportionately so that when the outer felly strikes an obstruction the momentum will force the inner felly or wheel forward against the tension of the springs and thereby assist the wheel over the obstruction, and at the same time the springs take up all the vibration or shock.

In constructing the spring ends of the spokes they may be flattened or rounded in cross-section as may be desired or expedient.

We are aware that springs have been used in connection with an inner and outer felly, one of which has been elastic. We are also aware that spring spokes have been made, but of a style wholly different from those herein described.

It is evident that many minor changes or modifications of our invention can be made and substituted for those shown and described, without in the least departing from the nature and principle of our invention.

Having thus described our invention, what we claim as new, and desire to secure by Letters Patent, is—

1. In a wheel, the combination with a hub, of two separated rigid fellies arranged one within the other, and spokes connecting the hub and inner felly and the inner and outer fellies and formed into springs between the fellies, substantially as described.

2. In a wheel, the combination with a hub, of inner and outer separated rigid fellies, and spokes rigidly connecting the inner felly and hub, and having their ends formed into springs located between and connecting the fellies, and consisting of a plurality of oppositely extending inclined sections joined by rounded heads, substantially as described.

3. In a wheel, the combination with a hub, of inner and outer rigid fellies, spokes connecting the hub with the fellies the portions between the fellies being formed into springs, and clamping bolts on the fellies at the ends of the springs for rigidly securing the same to the fellies, substantially as described.

In testimony whereof we affix our signatures in presence of two witnesses.

WILLIAM E. MEYER.
CHARLES M. YOUNG.
AMOS V. BOYCE.

Witnesses:
C. A. BEEK,
E. M. ADDINGTON.